US009210323B2

(12) United States Patent
Ogura et al.

(10) Patent No.: US 9,210,323 B2
(45) Date of Patent: Dec. 8, 2015

(54) IMAGE CAPTURE DEVICE AND IMAGE PROCESSOR

(71) Applicant: Panasonic Corporation, Osaka (JP)

(72) Inventors: Motonori Ogura, Osaka (JP); Yukitaka Tsuchida, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 14 days.

(21) Appl. No.: 13/969,971

(22) Filed: Aug. 19, 2013

(65) Prior Publication Data

US 2014/0063271 A1 Mar. 6, 2014

(30) Foreign Application Priority Data

Sep. 4, 2012 (JP) .................................. 2012-193782
Mar. 14, 2013 (JP) ................................. 2013-052268

(51) Int. Cl.
*H04N 5/228* (2006.01)
*H04N 5/232* (2006.01)

(52) U.S. Cl.
CPC ....... *H04N 5/23267* (2013.01); *H04N 5/23258* (2013.01)

(58) Field of Classification Search
USPC .......................................... 348/208.6, 208.2
See application file for complete search history.

(56) References Cited

U.S. PATENT DOCUMENTS

2007/0118257 A1   5/2007   Iida
2010/0013937 A1*  1/2010   Washisu et al. ............ 348/208.2

FOREIGN PATENT DOCUMENTS

| JP | 2002-094877 A | 3/2002 |
| JP | 2006-166713 A | 6/2006 |
| JP | 2010-230916 A | 10/2010 |
| JP | 2011-259394 A | 12/2011 |

OTHER PUBLICATIONS

Co-pending U.S. Appl. No. 13/969,933, filed Aug. 19, 2013.
Co-pending U.S. Appl. No. 13/969,728, filed Aug. 19, 2013.
Co-pending U.S. Appl. No. 13/969,745, filed Aug. 19, 2013.

* cited by examiner

*Primary Examiner* — Roberto Velez
*Assistant Examiner* — Stephen Coleman
(74) *Attorney, Agent, or Firm* — Renner, Otto, Boisselle & Sklar, LLP

(57) ABSTRACT

An image capture device according to the present disclosure includes: an image capturing section configured to generate an image by shooting; an acceleration detector configured to detect acceleration and output a first signal; an angular velocity detector configured to detect angular velocity and output a second signal; and a controller configured to determine an angle of rotation of the image based on at least a result of comparison between the first and second signals' DC components and a result of comparison between the first and second signals' AC components.

12 Claims, 8 Drawing Sheets

ACCELERATION OF GRAVITY: 1G $\theta 1 = \tan^{-1}\left(\dfrac{X}{\sqrt{Y^2+Z^2}}\right)$

θ1 : TILT ON XY PLANE

IMAGE CAPTURE DEVICE AND IMAGE PROCESSOR

BACKGROUND

1. Technical Field

The present disclosure relates to an image capture device and an image processor.

2. Description of the Related Art

Japanese Laid-Open Patent Publication No. 2002-94877 discloses an electronic camera, which writes, on a storage medium, image data representing an image that has been cropped out of an image obtained by shooting (which will be sometimes referred to herein as a "captured image"). This electronic camera makes a correction on an image by rotating the coordinates of an image area to be cropped out of a captured image in such a direction as to cancel the tilt of the image.

The present disclosure provides an image capture device and image processor that can make a tilt correction more appropriately.

SUMMARY

To overcome the problems described above, an image capture device according to the present disclosure includes: an image capturing section configured to generate an image by shooting; an acceleration detector configured to detect acceleration and output a first signal; an angular velocity detector configured to detect angular velocity and output a second signal; and a controller configured to determine an angle of rotation of the image based on at least one of a result of comparison between the first and second signals' DC components and a result of comparison between first and second signals' AC components.

An image processor according to the present disclosure processes a signal supplied from an image capture device that includes an image capturing section configured to generate an image by shooting, an acceleration detector configured to detect acceleration, and an angular velocity detector configured to detect angular velocity. The image processor includes: an interface configured to obtain a signal representing the image, a first signal representing the output of the acceleration detector, and a second signal representing the output of the angular velocity detector; and a controller configured to determine an angle of rotation of the image based on at least one of a result of comparison between the first and second signals' DC components and a result of comparison between first and second signals' AC components.

According to the technique of the present disclosure, an image capture device and image processor that can make a tilt correction more appropriately can be provided.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

DETAILED DESCRIPTION

Figure 1:
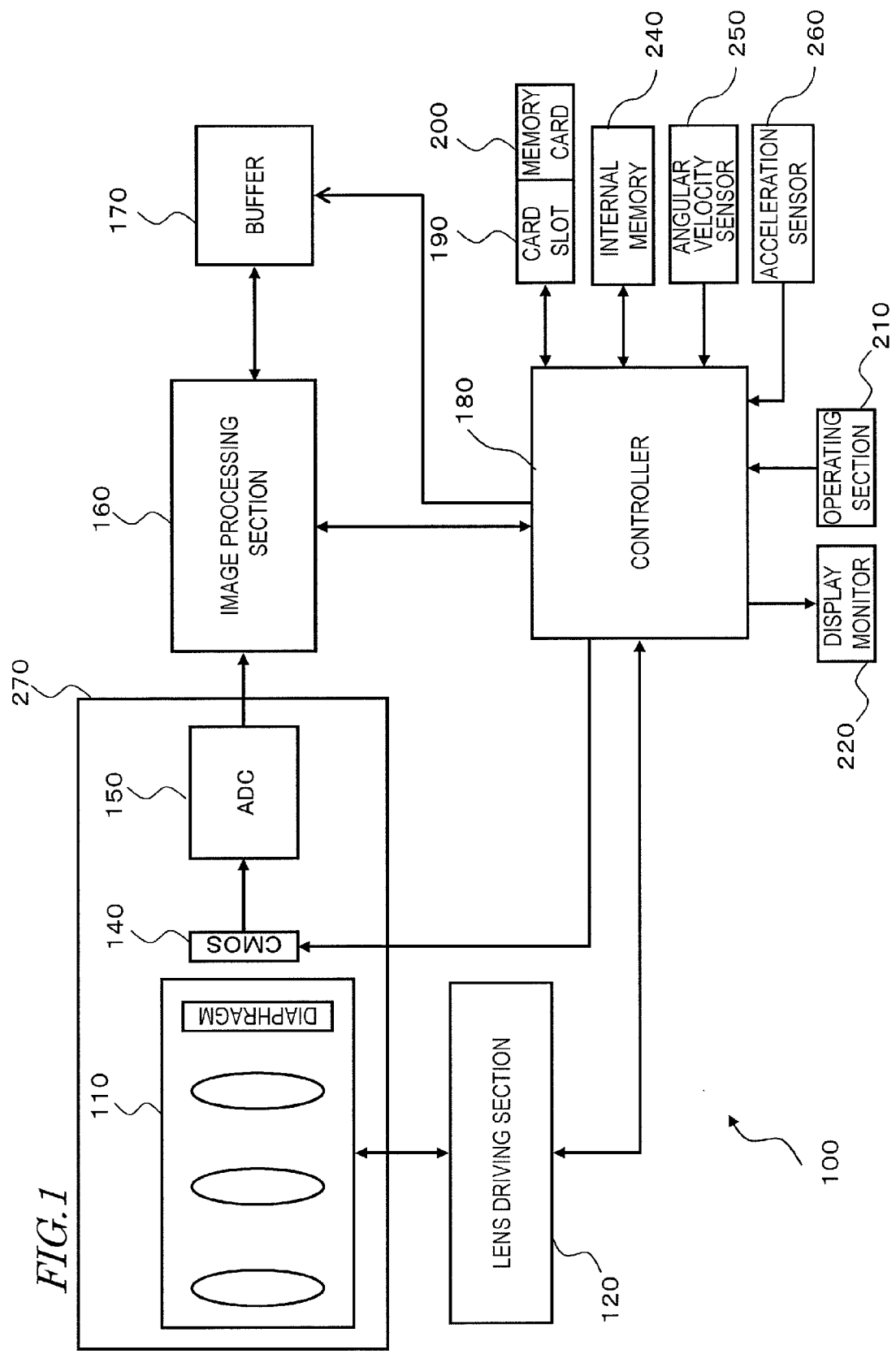
FIG. 1 is a block diagram illustrating an electrical configuration for a digital camcorder 100.

Hereinafter, embodiments will be described in detail with reference to the accompanying drawings as needed. It should be noted that the description thereof will be sometimes omitted unless it is absolutely necessary to go into details. For example, description of a matter that is already well known in the related art will be sometimes omitted, so will be a redundant description of substantially the same configuration. This is done solely for the purpose of avoiding redundancies and making the following description of embodiments as easily understandable for those skilled in the art as possible.

It should be noted that the present inventors provide the accompanying drawings and the following description to help those skilled in the art understand the present disclosure fully. And it is not intended that the subject matter defined by the appended claims is limited by those drawings or the description.

Embodiment 1

Hereinafter, a first embodiment in which the technique of the present disclosure is applied to a digital camcorder will be described with reference to the accompanying drawings. In the following description, a signal or data representing an image will be sometimes simply referred to herein as an "image". Also, the lateral direction of the digital camcorder will be sometimes referred to herein as "horizontal direction" and its longitudinal direction as "perpendicular (or vertical) direction", respectively.

1-1. Outline

The digital camcorder 100 of this embodiment has a tilt correction function and a rotational shake correction function. In this description, the "tilt correction function" is a function for correcting the tilt of a captured image which is caused by the device's own tilt with respect to the horizontal plane during shooting. The digital camcorder 100 has the function of correcting electronically the tilt of an image by calculating, based on the output of an acceleration sensor (acceleration detector) 260 that detects the acceleration of gravity, how much the perpendicular direction of its own device tilts with respect to the direction of the acceleration of gravity and rotating the coordinates of the image in a direction in which the tilt of the captured image can be canceled. On the other hand, the rotational shake correction function refers herein to the function of reducing the influence of the device's own shake (i.e., so-called "camera shake") during shooting on the captured image. The digital camcorder 100 has the function of correcting electronically the rotational shake of the image by rotating, based on the output of an angular velocity sensor (angular velocity detector) 250, the coordinates of an image to be cropped out of the captured image in a direction in which the shake in the roll direction (i.e., the direction of rotation that is defined with respect to the forward/backward direction of the camera as its axial direction) is canceled.

Hereinafter, a specific configuration and operation of the digital camcorder 100 will be described.

1-2. Configuration

Hereinafter, a configuration for the digital camcorder 100 of this embodiment will be described. FIG. 1 is a block diagram illustrating a configuration for the digital camcorder 100 and illustrates how respective components of this digital camcorder 100 are electrically connected together. This digital camcorder 100 includes an image capturing section 270, an image processing section 160, a buffer 170, a controller 180, a card slot 190, a memory card 200, an operating section 210, a display monitor 220, an internal memory 240, an angular velocity sensor 250, and an acceleration sensor 260. The image capturing section 270 includes an optical system 110, a lens driving section 120, a CMOS image sensor 140 and an A/D converter (ADC) 150.

The digital camcorder 100 obtains a subject image that has been produced through the optical system 200 including a single or multiple lenses converted into an electrical signal by the CMOS image sensor 140. The electrical signal generated by the CMOS image sensor 140 is subjected to various kinds of processing at the image processing section 160 and then stored on the memory card 200. Hereinafter, these components of this digital camcorder 100 will be described in further detail.

The optical system 110 includes a zoom lens, an optical image stabilizer (OIS) lens, a focus lens, a diaphragm, and other optical elements. By moving the zoom lens along the optical axis, the subject image produced on the image capturing plane of the CMOS image sensor 140 can be either zoomed in on or zoomed out. Also, by moving the focus lens along the optical axis, the focus of the subject image can be adjusted. The OIS lens is configured to be movable within a plane that crosses the optical axis of the optical system 110 at right angles. By shifting the OIS lens in such a direction as to cancel the shake of the digital camcorder 100, the influence of the shake of the digital camcorder 100 on the captured image can be reduced. The diaphragm adjusts the size of the aperture either in accordance with the user's setting or automatically, thereby controlling the quantity of light transmitted. In FIG. 1, three lenses are illustrated. However, this is only an example and any other appropriate number of lenses may be used according to the functions and performance required.

Optionally, the optical system 110 may further include a zoom actuator which drives the zoom lens, an OIS actuator which drives the OIS lens, a focus actuator which drives the focus lens, and a diaphragm actuator which drives the diaphragm.

The lens driving section 120 drives these various kinds of lenses and diaphragm included in the optical system 110. For example, the lens driving section 120 controls the zoom actuator, focus actuator, OIS actuator and diaphragm actuator which may be included in the optical system 110.

The CMOS image sensor 140 converts the subject image that has been produced by the optical system 110 into an electrical signal, thereby generating analog image data. The CMOS image sensor 140 performs various kinds of operations including exposure, transfer and electronic shuttering. Optionally, the CMOS image sensor 140 may be replaced with any other kind of image sensor such as a CCD image sensor or an NMOS image sensor.

The A/D converter 150 is a circuit which converts the analog image data that has been generated by the CMOS image sensor 140 into digital image data. The output of the A/D converter 150 is passed to the image processing section 160.

The image capturing section 270 is made up of a plurality of components including the optical system 110, the CMOS image sensor 140 and the A/D converter 150. The image capturing section 270 sequentially generates digital image data, including a plurality of frames that are continuous with each other on the time axis, by capturing an image and outputs the digital image data one after another.

The image processing section 160 is a circuit which performs various kinds of processing on the image data that has been generated by the CMOS image sensor 140. The image processing section 160 may be implemented as a digital signal processor (DSP) or a microcontroller (microprocessor), for example. The image processing section 160 generates image data to be displayed on the display monitor 220 or image data to be stored on the memory card 200. For example, the image processing section 160 performs gamma correction, white balance correction, flaw correction and various other kinds of processing on the image data that has been generated by the CMOS image sensor 140. Also, the image processing section 160 compresses the image data that has been supplied from the image capturing section 270 compliant with a predetermined standard such as the H.264 standard or the MPEG-2 standard.

The image processing section 160 subjects the image data to coordinate rotation processing, thereby reducing the tilt in the roll direction to be caused to the image produced on the image capturing plane of the CMOS image sensor 140 by the device's own tilt or rotational shake during shooting. Suppose a situation where the digital camcorder 100 has rotated θ degrees counterclockwise due to the hand tremor of a person who is shooting a subject image or a situation where the shooter has shot the subject image with the digital camcorder 100 tilted θ degrees counterclockwise with respect to its reference position from the beginning (i.e., intentionally). In each of these cases, a corrected image is generated by rotating the entire image θ degrees clockwise thanks to the tilt and rotational shake correction function of the image processing section 160. At this time, the image processing section 160 rotates the coordinates of the image data θ degrees clockwise and then crops image data out of an appropriate range. As a result, image data in which the subject is not tilted in the direction of rotation can be cropped. In this manner, the image processing section 160 generates an image that has had its shake in the direction of rotation reduced.

The controller 180 is a processor which controls the overall operation of this digital camcorder. The controller 180 may be implemented as a semiconductor integrated circuit such as a microprocessor, for example. In one embodiment, the controller 180 may be implemented as combination of a central processing unit (CPU) and a program (software). Alternatively, the controller 180 may also be implemented as only a set of dedicated hardware components. The controller 180 may generate a vertical sync signal at 60 fps, for example. The magnitude of tilt correction to be made based on the respective outputs of the angular velocity sensor 250 and the acceleration sensor 260 is calculated within one period of the vertical sync signal. In this manner, an image that has had its tilt corrected appropriately can be obtained. It should be noted that one period of the vertical sync signal does not have to be 60 fps but may also be set to be any other value.

In FIG. 1, the image processing section 160 and the controller 180 are illustrated as two separate components. However, the image processing section 160 and the controller 180 may also be implemented as a single physically combined integrated circuit. That is to say, the image processing section 160 and the controller 180 do not have to be implemented on two different semiconductor chips but may also form a single semiconductor chip as well.

The buffer 170 functions as a work memory for the image processing section 160 and the controller 180 and may be implemented as a DRAM or a ferroelectric memory, for example.

The card slot 190 is an interface, to/from which the memory card 200 is readily insertable and removable, and can be connected to the memory card 200 both mechanically and electrically. The memory card 200 includes a flash memory, a ferroelectric memory or any other kind of internal memory, and can store image files and other data that have been generated by the image processing section 160. It should be noted that the memory card 200 shown in FIG. 1 does not form part of the digital camcorder 100 but is an external component.

The internal memory 240 may be implemented as a flash memory or a ferroelectric memory, for example, and may store a control program for controlling the overall operation of this digital camcorder 100.

The operating section 210 is a generic term which collectively refers to various kinds of user interfaces through which the user can enter his or her instructions. The operating section 210 includes cross keys and an ENTER button which accept the user's instructions.

The display monitor 220 may be implemented as a liquid crystal display or an organic EL display, for example. The display monitor 220 may display either an image represented by the image data that has been supplied from the image capturing section 270 and processed by the image processing section 160 (i.e., a through-the-lens image) or an image represented by the image data that has been read out from the memory card 200. In addition, the display monitor 220 can also display various kinds of menus which allow the user to change various settings of this digital camcorder 100.

As described above, the digital camcorder 100 of this embodiment includes an acceleration sensor 260 and an angular velocity sensor 250. Hereinafter, the respective axes of detection of the acceleration sensor 260 and the angular velocity sensor 250 will be described with reference to FIG. 2A, which schematically illustrates the axes of detection of the acceleration sensor 260 and the angular velocity sensor 250.

The acceleration sensor 260 is a sensor which detects the tilt of this digital camcorder 100 in the perpendicular direction with respect to the direction of the acceleration of gravity. As the acceleration sensor 260, a semiconductor acceleration sensor such as a capacitance coupled type, a piezoresistance type or a heat sensing type may be used, for example. However, the acceleration sensor 260 does not have to be such a semiconductor sensor, but may also be an optical or mechanical sensor as well.

Figure 2A:
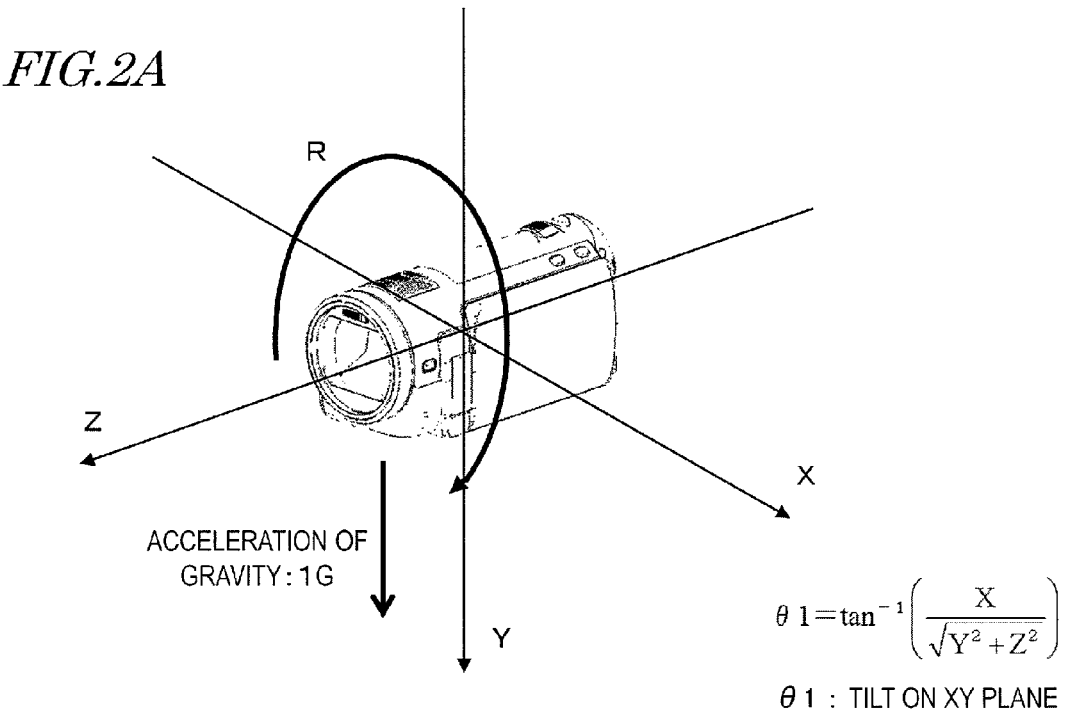
FIG. 2A schematically illustrates the axes of detection of an acceleration sensor and an angular velocity sensor.

As shown in FIG. 2A, the acceleration sensor 260 of this embodiment includes a sensor which detects an acceleration component in the optical axis direction (i.e., the Z-axis direction) of this digital camcorder 100, a sensor which detects an acceleration component within a plane that crosses the Z-axis at right angles and in the horizontal direction (i.e., X-axis direction) of this digital camcorder 100, and a sensor which detects an acceleration component within a plane that crosses the Z-axis at right angles and in the perpendicular direction (i.e., Y-axis direction) of this digital camcorder 100. In this description, these sensors will be collectively referred to herein as an "acceleration sensor 260". Since the X-, Y- and Z-axes are fixed with respect to this digital camcorder 100, the acceleration components detected in these X-, Y- and Z-axis directions vary as this digital camcorder 100 changes its attitude.

Information about the acceleration which has been detected by the acceleration sensor 260 in the X-, Y- and Z-axis directions is provided for the controller 180. By analyzing the respective output signals in the X-, Y- and Z-axis directions of the acceleration sensor 260, the controller 180 can calculate a first quantity of correction (i.e., a first angle of correction) to correct the tilt angle θ1 of the digital camcorder 100. In this case, if the respective values of the acceleration components that have been detected in the X-, Y- and Z-axis directions are indicated by X, Y and Z, respectively, the tilt angle θ1 defined by the Y-axis with respect to the direction of the acceleration of gravity of this digital camcorder 100 can be calculated by the following Equation (1):

$$\theta 1 = \tan^{-1}\left(\frac{X}{\sqrt{Y^2+Z^2}}\right) \qquad (1)$$

Figure 2B:
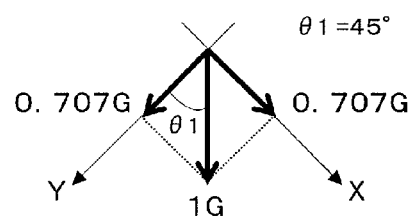
FIGS. 2B and 2C illustrate examples of X- and Y-components of the gravitational acceleration.
Figure 2C:
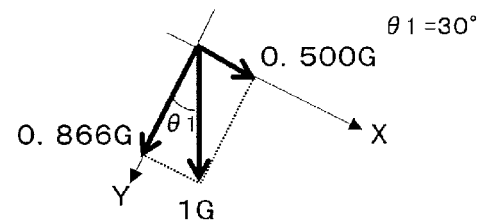

For example, suppose that if the magnitude of the acceleration of gravity is 1 G (approximately 9.807 m/s$^2$), the acceleration values of the respective components that have been detected by the acceleration sensor 260 have turned out to be X=Y=0.707 G and Z=0 as shown in FIG. 2B, which represents a situation where this digital camcorder 100 is not tilted but in the roll (R) direction. In that case, the controller 180 obtains θ=45 degrees as a result of calculation that has been made based on Equation (1). On the other hand, suppose that the acceleration values of the respective components that have been detected by the acceleration sensor 260 have turned out to be X=0.500 G, Y=0.866 G and Z=0 as shown in FIG. 2C. In that case, the controller 180 obtains θ1-30 degrees as a result of calculation that has been made based on Equation (1). In any case other than these, the controller 180 can also calculate the tilt angle θ1 by Equation (1).

It should be noted that if the tilt in the pitch direction (i.e., the direction of rotation around the X-axis) is not taken into consideration, the acceleration sensor 260 does not have to include any sensor which detects the Z-axis component of the acceleration. In that case, the tilt angle θ1 may be calculated by the following Equation (2):

$$\theta 1 = \tan^{-1}\left(\frac{X}{Y}\right) \qquad (2)$$

The angular velocity sensor 250 detects the angular velocity of this digital camcorder 100. The angular velocity sensor 250 may be a vibrating gyrosensor, for example, which can sense the angular velocity by measuring the magnitude of displacement of a rotating vibrator being subjected to the Coriolis force. Optionally, an optical sensor or any other kind of sensor may also be used as the angular velocity sensor 250.

As shown in FIG. 2A, the angular velocity sensor 250 of this embodiment includes a sensor which detects the angular velocity of the movement of this digital camcorder 100 to be caused in the roll (R) direction due to a camera shake, for example. The angular velocity sensor 250 may further include a sensor for detecting the angular velocity in the yaw direction (i.e., the direction of rotation around the Y-axis) and a sensor for detecting the angular velocity in the pitch direction (i.e., the direction of rotation around the X-axis), in addition to the sensor for detecting the angular velocity in the roll direction. By analyzing the output signal of the angular velocity sensor 250 as for the roll direction, the controller 180 can calculate a second quantity of correction (i.e., a second angle of correction) to make a correction on the tilt angle θ2 caused by the shake of this digital camcorder 100 in the roll direction during a shooting session.

Figure 3:
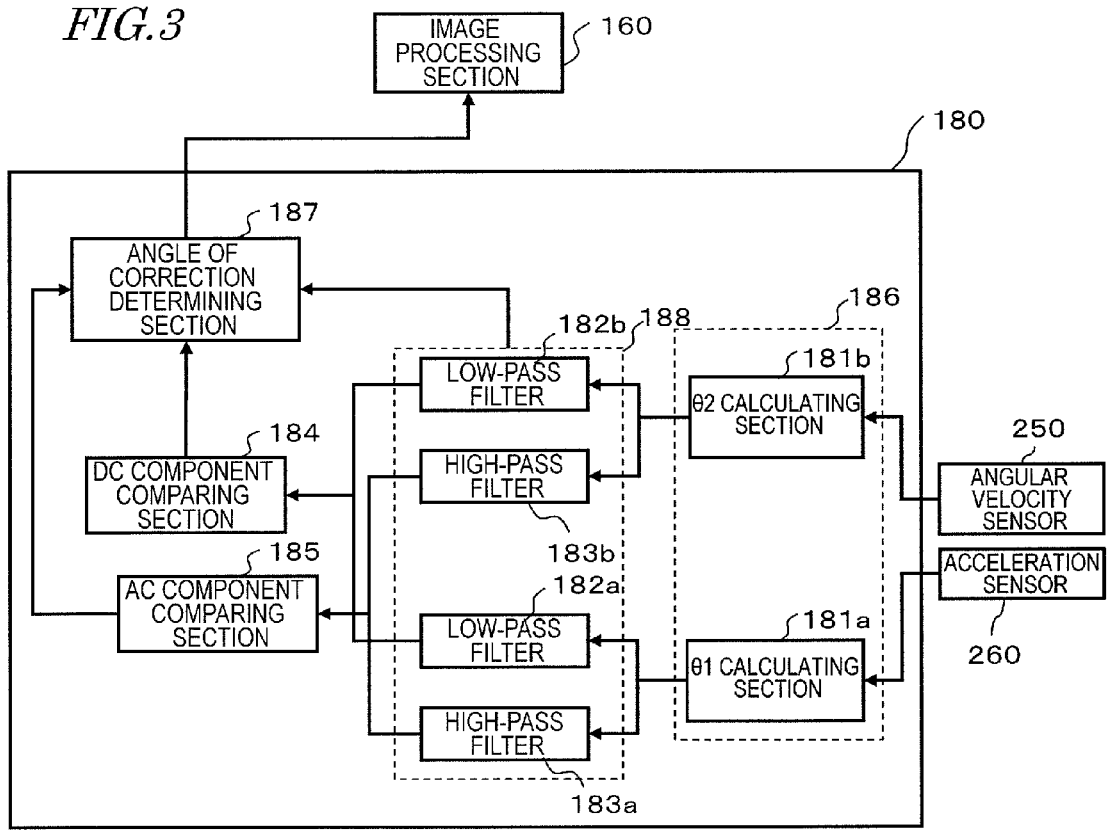
FIG. 3 is a block diagram illustrating an exemplary configuration for a controller 180.

FIG. 3 illustrates an exemplary configuration for the controller 180 that carries out the operation described above. In FIG. 3, the arrows indicate main signal flows. The controller 180 includes an angle calculating section 186 which calculates angles θ1 and θ2 based on the respective outputs of the acceleration sensor 260 and the angular velocity sensor 250 and outputs them, a filter 188 which extracts DC and AC components from each of the signals representing the angles θ1 and θ2, a DC component comparing section 184 which compares the respective DC components of the angles θ1 and θ2 to each other, an AC component comparing section 185 which compares the respective AC components of the angles θ1 and θ2 to each other, and an angle of correction determining section 187 which determines a final angle of correction based on the respective outputs of the DC component comparing section 184 and the AC component comparing section 185. The angle calculating section 186 includes a θ1 calculating section 181*a* which calculates the tilt angle θ1 based on the output of the acceleration sensor 260 and a θ2 calculating section 182*a* which calculates the tilt angle θ2 based on the output of the angular velocity sensor 250. The filter 188 includes low-pass filters 182*a* and 182*b* which extract DC components from the outputs of the θ1 and θ2 calculating sections 181*a* and 181*b*, respectively, and high-pass filters 183*a* and 183*b* which extract AC components from the outputs of the θ1 and θ2 calculating sections 181*a* and 181*b*, respectively. Each of these functional blocks may be implemented as either a dedicated circuit or a combination of a program and a processor. It will be described later exactly how these sections operate.

It should be noted that the sets of components shown in FIGS. 1 and 3 are just an example and this digital camcorder 100 may also have any other configuration as long as the digital camcorder 100 can perform the operation to be described later. For example, some of the components shown in FIG. 1 may be omitted from this digital camcorder 100. Also, this digital camcorder 100 may further include a power supply, a storage device such as a hard disk drive, a flash, an external interface and any other additional components.

1-3. Operation

By performing coordinate rotation processing on the image data, the digital camcorder 100 of this embodiment can reduce the influence of its own tilt in the roll direction on the image that has been produced on the image capturing plane of the CMOS image sensor 140.

If the decision has been made that the respective DC components of a first signal representing the tilt angle θ1 that has been calculated based on the result of detection obtained by the acceleration sensor 260 and a second signal representing the tilt angle θ2 that has been calculated based on the result of detection obtained by the angular velocity sensor 250 agree with each other, the digital camcorder 100 corrects the captured image based on the result of detection obtained by the angular velocity sensor 250.

On the other hand, if the decision has been made that the respective DC components of the first and second signals do not agree with each other and that the respective AC components (which will be sometimes referred to herein as "phases") of the first and second signals do not correspond to each other, then the digital camcorder 100 corrects the captured image based on the DC component of the first signal and the second signal.

Furthermore, if the decision has been made that the respective DC components of the first and second signals do not agree with each other but that the first and second signals' AC components do correspond to each other, then the digital camcorder 100 corrects the captured image based on the first signal. In that case, the second signal may also be used as needed.

Hereinafter, it will be described exactly how the digital camcorder 100 makes a correction on the captured image.

1-3-1. On Output Noise of Acceleration Sensor

The digital camcorder 100 of this embodiment corrects the tilt of the captured image by calculating the magnitude of tilt based mainly on the result of detection obtained by the acceleration sensor 250. However, the digital camcorder 100 sometimes calculates the magnitude of tilt by using the output of the angular velocity sensor 250 as needed as well.

If the acceleration sensor 260 produced significant output noise, then the controller 180 could attribute by mistake the output noise component to the tilt of the digital camcorder 100 and could correct the tilt too much by failing to sense the exact magnitude of tilt of the digital camcorder 100. That is to say, in such a situation, the angle that has been detected erroneously as tilt due to the output noise could be corrected so much that the image displayed on the screen could rotate unintentionally. To avoid such an unwanted situation, the output noise of the acceleration sensor 260 needs to be reduced sufficiently by filtering or any other means. If filtering is carried out sufficiently, then the output noise can be reduced, and therefore, erroneous tilt correction can be avoided.

Nevertheless, if filtering were carried out excessively, then the correction operation itself could not respond quickly enough due to that filtering. In such a situation, if the operation of tilting the digital camcorder 100 is carried out repeatedly, then the correction operation would fail to keep up with the display operation, thus displaying video that is unpleasant to the viewer's eye as in the case of hunting.

The present inventors faced, via experiments, such a problem that the tilt correction should be done appropriately with such an erroneous operation due to the output noise of the acceleration sensor 260 avoided as perfectly as possible.

1-3-2. Comparison of Angle Values Calculated in Two Ways

The digital camcorder 100 of this embodiment calculates a tilt angle θ1 based on the result of detection obtained by the acceleration sensor 260 and another tilt angle θ2 based on the result of detection obtained by the angular velocity sensor 250, respectively, and compares the results of these two kinds of processing to each other, thereby determining the final angle of correction in its own roll direction and correcting the image shot based on the angle of correction. And by comparing the DC components of signals representing the two tilt angles that have been calculated through these two kinds of processing to each other and also comparing their AC components to each other, the digital camcorder 100 determines which of the two tilt angles needs to be used how much. As a result, the erroneous tilt correction due to the output noise of the acceleration sensor 260 can be avoided much more perfectly with the filtering that could delay the correction minimized.

Figure 4:
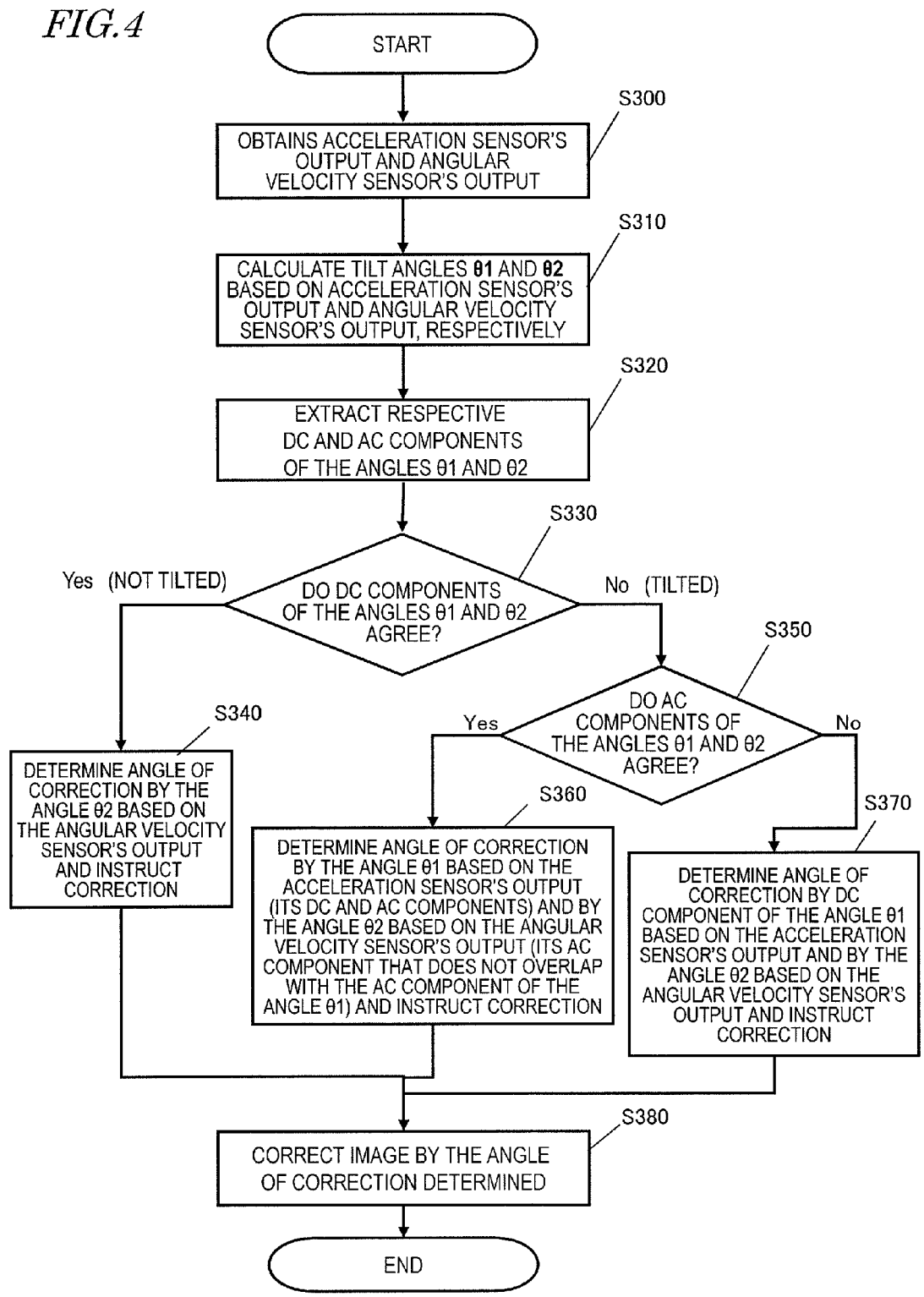
FIG. 4 is a flowchart showing the procedure of an image tilt correcting operation according to a first exemplary embodiment.
Figure 5:
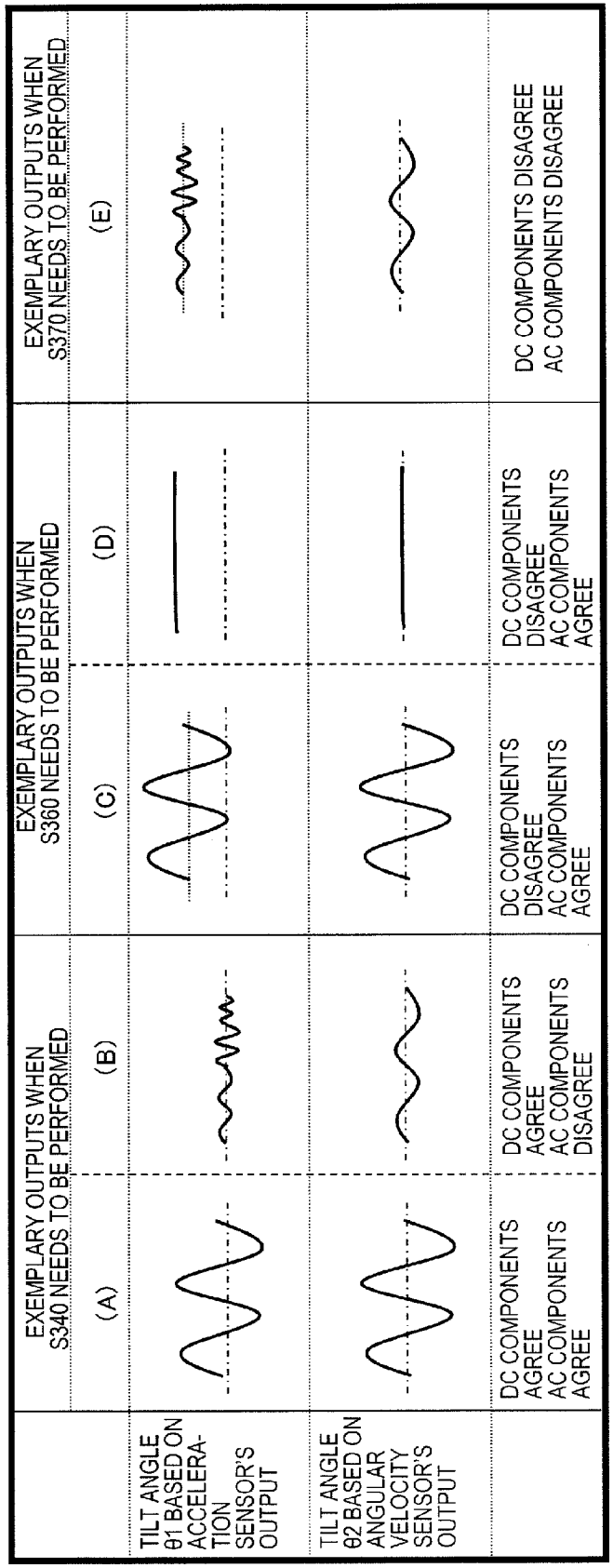
FIG. 5 schematically illustrates some exemplary waveforms of signals representing the tilt angles $\theta 1$ and $\theta 2$, of which the DC and AC components need to be compared to each other.

Hereinafter, it will be described with reference to the flowchart shown in FIG. 4 and the waveform diagram shown in FIG. 5 exactly how to make a tilt correction and a rotational shake correction according to this embodiment. FIG. 4 is a flowchart showing the procedure in which the controller 180 determines the angle of correction. FIG. 5 schematically illustrates some exemplary waveforms of signals representing the tilt angles θ1 and θ2, of which the DC and AC components need to be compared to each other. In FIG. 5, the abscissa (indicated by the one-dot chain) represents the time.

FIG. 4 shows the procedure of correction processing to be performed on a single frame. By carrying out the processing steps shown in FIG. 4 on each of the frames that are sequentially output one after another from the image capturing section 270, the controller 180 determines the angle of rotation (i.e., angle of correction) to correct the tilt and instructs the image processing section 160 to make a correction. First of all, the controller 180 obtains the output signals of the acceleration sensor 260 and the angular velocity sensor 250 (in Step S300). Next, the controller 180 calculates tilt angles θ1 and θ2 based on the outputs of the acceleration sensor 260 and angular velocity sensor 250, respectively (in Step S310). Specifically, the θ1 calculating section 181*a* of the controller 180 performs the arithmetic operation represented by Equation (1) based on the output of the acceleration sensor 260, thereby calculating the angle θ1. Meanwhile, the θ2 calculating section 181*b* of the controller 180 finds the integral of the outputs that have been supplied from the angular velocity sensor 250 so far, thereby calculating the angle θ2. Subsequently, the controller 180 obtains the DC and AC components of a first signal representing the angle θ1 extracted by the low-pass filter 182*a* and the high-pass filter 183*a*, respectively, and obtains the DC and AC components of a second signal representing the angle θ2 extracted by the low-pass filter 182*b* and the high-pass filter 183*b*, respectively (in Step S320).

Next, the controller 180 compares the respective DC components of the tilt angles θ1 and θ2 that have been respectively calculated based on the outputs of the acceleration sensor 260 and the angular velocity sensor 250 to each other, thereby determining whether or not these two DC components agree with each other (in Step S330). This comparison is made by the DC component comparing section 184. Actually, the DC components do not always perfectly agree with each other due to some detection errors. That is why by seeing if their difference falls within a predetermined tolerance range, the DC component comparing section 184 of the controller 180 determines whether or not these DC components agree with each other. More specifically, if the difference between these DC components is smaller than a predetermined threshold value, the DC component comparing section 184 sends a signal indicating that these two DC components substantially agree with each other to the angle of correction determining section 187. On the other hand, if the difference between these DC components is equal to or greater than the predetermined threshold value, the DC component comparing section 184 sends a signal indicating that these two DC components are different from each other to the angle of correction determining section 187.

If the digital camcorder 100 is tilted from its reference position (i.e., the position of the digital camcorder 100 that is held to face the subject straight on), the DC component of the first signal representing the tilt angle θ1 that has been calculated based on the output of the acceleration sensor 260 has a value corresponding to that tilt. On the other hand, even if the digital camcorder 100 is tilted, the DC component of the signal representing the tilt angle θ2 that has been calculated based on the output of the angular velocity sensor 250 does not correspond to that tilt. That is why if the decision has been made that the respective DC components of the first and second signals based on the outputs of the acceleration sensor 260 and angular velocity sensor 250 agree with each other (i.e., if the answer to the query of the processing step S330 is YES), then it means that this digital camcorder 100 is not tilted. In that case, the angle of correction determining section 187 of the controller 180 ignores the value θ1 that has been calculated based on the output signal of the acceleration sensor 260 and calculates the angle of correction to correct the rotational shake based on the value θ2 that has been calculated based on the output signal of the angular velocity sensor 250. In that case, the angle of correction is set to be −θ2. Then, the angle of correction determining section 187 notifies the image processing section 160 of this angle of correction calculated (in Step S340). As a result, the image processing section 160 can make a rotational shake correction appropriately on the captured image (in Step S380).

Portions (A) and (B) of FIG. 5 show exemplary waveforms of signals representing tilt angles θ1 and θ2 that have been calculated based on the output signals of the acceleration sensor 260 and angular velocity sensor 250 when the processing step 340 needs to be performed. Specifically, portion (A) of FIG. 5 shows a situation where not only the DC components but also the AC components (phases) of those tilt angles θ1 and θ2 calculated based on the output signals of the acceleration sensor 260 and angular velocity sensor 250 agree with each other. On the other hand, portion (B) of FIG. 5 shows a situation where the DC components of those tilt angles θ1 and θ2 calculated based on the output signals of the acceleration sensor 260 and angular velocity sensor 250 do agree with each other but their AC components (phases) are different from each other. In each of these two situations shown in portions (A) and (B) of FIG. 5, their DC components agree with each other, which means that the digital camcorder 100 is not tilted. Consequently, no tilt correction is carried out on the captured image based on the result of detection obtained by the acceleration sensor 260 but a rotational shake correction is carried out on the captured image based on the result of detection obtained by the angular velocity sensor 250.

On the other hand, if the DC component comparing section 184 has found that the DC components of those tilt angles θ1 and θ2 calculated based on the output signals of the acceleration sensor 260 and angular velocity sensor 250 do not agree with each other (i.e., if the answer to the query of the processing step S330 is NO), then it means that the digital camcorder 100 is tilted. In that case, the controller 180 compares the respective AC components of the angles θ1 and θ2 that have been calculated based on the outputs of the acceleration sensor 260 and angular velocity sensor 250 to each other (in Step S350). This comparison is made by the AC component comparing section 185. Actually, however, those AC components do not always perfectly agree with each other due to some detection error, for example. That is why the AC component comparing section 185 of the controller 180 determines whether or not their AC components substantially agree with each other (i.e., correspond to each other) by seeing if their difference falls within a predetermined tolerance range. More specifically, if the difference between their AC component values is smaller than a preset threshold value, the AC component comparing section 185 sends a signal indicating that their AC components substantially agree with each other to the angle of correction determining section 187. In this description, if the difference between the respective AC component values of two signals is less than predetermined threshold value, then their AC components are regarded herein as "corresponding to each other". Conversely, if the difference between their AC components is equal to or greater than the predetermined threshold value, then the AC component comparing section 185 sends a signal indicating that their AC components are different from each other to the angle of correction determining section 187.

Alternatively, the controller 180 may also determine whether the AC components of two signals correspond to each other or not by a different method from what has just been described. For instance, the controller 180 may calculate the degree of similarity between the respective waveforms of two signals up to the point in time of making a comparison. If the degree of similarity turns out to be less than a predetermined threshold value, the controller 180 may regard their AC components as corresponding to each other. On the other hand, if the degree of similarity turns out to be equal to or greater than the threshold value, then the controller 180 may regard their AC components as not corresponding to each other. The degree S of similarity may be calculated by one of the following Equations (3) and (4):

$$S = \sum_t (\theta 1ac(t) - \theta 2ac(t))^2 \quad (3)$$

$$S = \sum_t |\theta 1ac(t) - \theta 2ac(t)| \quad (4)$$

where t indicates the time, θ1ac(t) indicates a signal representing the AC component of the angle θ1 that has been calculated based on the output of the acceleration sensor 260, and θ2ac(t) indicates a signal representing the AC component of the angle θ2 that has been calculated based on the output of the angular velocity sensor 250. The time t is a discrete value representing a point in time associated with each frame. In these equations, the sum is calculated over a period of time corresponding to several frames to several hundreds of frames.

If their AC components correspond to each other (if the answer to the query of the processing step S350 is YES), the controller 180 finds the output value of the acceleration sensor 260 right. That is why the angle of correction determining section 187 calculates the angle of correction to correct the tilt of the digital camcorder 100 based on both the DC and AC components of the first signal representing the angle θ1 that has been calculated based on the output value of the acceleration sensor 260. In this processing step, the angle of correction determining section 187 may determine the angle of correction with the angle θ2 that has been calculated based on the output of the angular velocity sensor 250 also taken into account. However, to avoid making both the tilt correction based on the output of the acceleration sensor 260 and the rotational shake correction based on the output of the angular velocity sensor 250 at the same time, the correction operation based on the output of the angular velocity sensor 250 is not performed on the AC components that can be corrected based on the output of the acceleration sensor 260. Specifically, the angle of correction determining section 187 determines a first angle of correction using the angle θ1 (DC and AC components) based on the output of the acceleration sensor 260, and calculates a second angle of correction based on the output value of the angular velocity sensor 250 as for the AC component (RF component) that cannot be corrected completely with only the first angle of correction. And the angle of correction determining section 187 determines the sum of the first and second angles of correction to be the final angle of correction. Then, the angle of correction determining section 187 notifies the image processing section 160 of the first angle of correction to correct the tilt calculated and the second angle of correction to correct the rotational shake. As a result, the image processing section 160 can make the rotational shake correction appropriately (in Step S380).

Portions (C) and (D) of FIG. 5 show exemplary waveforms of signals representing tilt angles θ1 and θ2 that have been calculated based on the output signals of the acceleration sensor 260 and angular velocity sensor 250 when the processing step 360 needs to be performed. Specifically, these portions (C) and (D) of FIG. 5 show a situation where the DC components of those tilt angles θ1 and θ2 calculated based on the output signals of the acceleration sensor 260 and angular velocity sensor 250 disagree with each other but their AC components agree with each other. In each of these portions (C) and (D) of FIG. 5, their DC components disagree with each other, which means that the digital camcorder 100 is tilted. That is why a tilt correction is carried out on the captured image based on the result of detection obtained by the acceleration sensor 260. And on the RF component that cannot be corrected completely through only the tilt correction, a rotational shake correction is further carried out on the captured image based on the result of detection obtained by the angular velocity sensor 250.

On the other hand, if the DC components of the angles θ1 and θ2 are different from each other (i.e., if the answer to the query of the processing step S330 is NO) and if the AC components of the angles θ1 and θ2 are also different from each other (i.e., if the answer to the query of the processing step S350 is NO), then the decision can be made that the AC component of the tilt angle θ1 that has been calculated based on the output of the acceleration sensor 260 is output noise. Thus, in that case, the angle of correction determining section 187 of the controller 180 removes that AC component of the angle θ1 based on the output of the acceleration sensor 260 and calculates a first angle of correction to correct the tilt of the digital camcorder 100 based on only the DC component. In this case, since the AC component has been removed from the first angle of correction to make the tilt correction, the angle of correction determining section 187 compensates for the removed AC component with the output of the angular velocity sensor 250. That is to say, the angle of correction determining section 187 calculates a second angle of correction to correct the rotational shake of the digital camcorder 100 based on the output value of the angular velocity sensor 250. Then, the angle of correction determining section 187 notifies the image processing section 160 of the first angle of correction to correct the tilt calculated and the second angle of correction to correct the rotational shake. As a result, the image processing section 160 can make the rotational shake correction appropriately (in Step S380).

Portion (E) of FIG. 5 shows exemplary waveforms of signals representing tilt angles θ1 and θ2 that have been calculated based on the output signals of the acceleration sensor 260 and angular velocity sensor 250 when the processing step 370 needs to be performed. Specifically, this portion (E) of FIG. 5 shows a situation where neither the DC components nor the AC components (phases) agree with each other between the output signals of the acceleration sensor 260 and angular velocity sensor 250. In this portion (E) of FIG. 5, their DC components disagree with each other, which means that the digital camcorder 100 is tilted. That is why a tilt correction is carried out on the captured image based on the result of detection obtained by the acceleration sensor 260. On top of that, since their AC components also disagree with each other, the AC component of the angle θ1 that has been calculated based on the output of the acceleration sensor 260 is regarded as an unreliable one and removed. Then, a rotational shake correction is made on the captured image based on the result of detection obtained by the angular velocity sensor 250.

By rotating the image by the angle of correction provided by the controller 180 in such a direction as to reduce the tilt of the image, the image processing section 160 generates a tilt-corrected image (in Step S380). Hereinafter, it will be described with reference to FIG. 6 how the image processing section 160 may perform the tilt correction processing.

Figure 6:
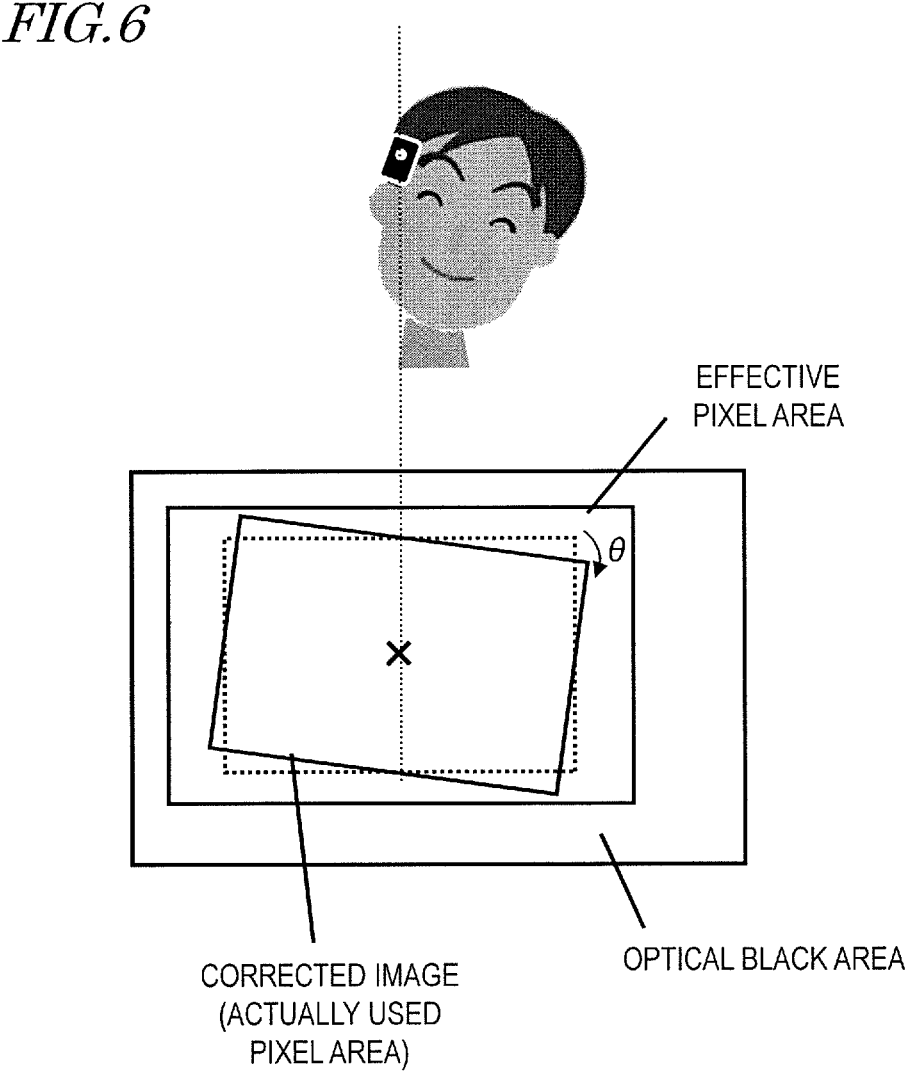
FIG. 6 illustrates schematically how to make a correction on an image.

FIG. 6 schematically illustrates how to perform the tilt correction processing. In FIG. 6, illustrated is an example in which the digital camcorder 100 is used as a wearable camera that the user uses by wearing it on his or her face or clothes. In FIG. 6, illustrated are image areas corresponding to the optical black area, effective pixel area and actually used pixel area in the CMOS image sensor 140. The image processing section 160 rotates the image supplied from the image capturing section 270 by the angle correction θ in such a direction as to reduce the tilt of the image, and then performs image cropping processing in the effective pixel area of the CMOS image sensor 140. Then, the image processing section 160 outputs the cropped image (i.e., the image in the actually used pixel area indicated by the solid rectangle) as a corrected image. As a result, even if the tilt of the captured image in the roll direction is corrected, an image that does not include any pixel in the optical black area can also be recorded just as intended.

In the embodiment described above, the "AC component" is supposed to include every frequency component of a signal other than its DC components (with a frequency of zero). However, the "AC component" does not have to include every frequency component. Alternatively, by using a band-pass filter which is designed to pass only a required frequency component as the high-pass filter 183a, 183b, a signal from which some frequency components have been removed may be used as the "AC component".

1-4. Effects

As described above, the digital camcorder 100 of this embodiment includes: an image capturing section 270 which generates an image by shooting; an acceleration sensor 260 which detects the acceleration of gravity; an angular velocity sensor 250 which detects an angular velocity; and a controller 180 which determines the angle of rotation of the image (i.e., the angle of correction) based on the respective outputs of the acceleration sensor 260 and the angular velocity sensor 250. More specifically, the controller 180 determines the angle of rotation of the image based on a result of comparison between respective DC components of first and second signals representing the outputs of the acceleration sensor 260 and the angular velocity sensor 250, respectively, and a result of comparison between first and second signals' AC components. As a result, the tilt correction can get done appropriately with a delay of response, which would otherwise be involved with excessive filtering processing to reduce the output noise of the acceleration sensor 260, reduced significantly.

In a specific embodiment, if the difference between respective values of the first and second signals' DC components θ1 and θ2 is smaller than a preset threshold value, the controller 180 determines the angle of correction based on the second signal θ2 (in Step S340 shown in FIG. 4). According to such an embodiment, in a situation where there should be no tilt, the output of the angular velocity sensor 250 which is more reliable than that of the acceleration sensor 260 is used, and therefore, the angle of correction can be determined appropriately.

In another embodiment, if the difference between respective values of the first and second signals' DC components θ1 and θ2 is equal to or greater than the threshold value and unless the first and second signals' AC components θ1 and θ2 correspond to each other, the controller 180 determines the angle of rotation based on the second signal θ2 and the DC component of the first signal θ1 (in Step S370 shown in FIG. 4). According to such an embodiment, if the AC component of the first signal θ1 based on the output of the acceleration sensor 260 has a low degree of reliability, then the output of the angular velocity sensor 250 with a higher degree of reliability is used, and therefore, the angle of correction can be determined more appropriately.

In still another embodiment, if the difference between respective values of the first and second signals' DC components θ1 and θ2 is equal to or greater than the threshold value and if the first and second signals' AC components θ1 and θ2 correspond to each other, the controller 180 determines the angle of rotation based on the first signal θ1 (in a modified example of Step S360 shown in FIG. 4). According to such an embodiment, the output of the acceleration sensor 260 is used if it is a reliable one, and therefore, the angle of correction can be determined more appropriately.

In yet another embodiment, if the difference between respective values of the first and second signals' DC components θ1 and θ2 is equal to or greater than the threshold value and if the first and second signals' AC components θ1 and θ2 correspond to each other, the controller 180 determines the angle of rotation based on the DC and AC components of the first signal θ1 and on a portion of the AC component of the second signal θ2 that does not overlap with the AC component of the first signal θ1 (in Step S360 shown in FIG. 4). According to such an embodiment, even radio frequency components, which could not be corrected sufficiently only with the angle of correction to be determined based on the output of the acceleration sensor 260, can also be corrected sufficiently. As a result, correction can be made on rotational shake even more accurately.

In yet another embodiment, the digital camcorder 100 further includes an image processing section 160 which corrects the image by rotating the coordinates of the image by the angle of rotation that has been determined by the controller 180. According to such an embodiment, the tilt (including the rotational shake) of the image can be corrected based on the angle of rotation that has been determined appropriately.

As can be seen, the digital camcorder 100 of this embodiment compares the DC component of a signal representing the angle θ1 of tilt correction that has been calculated based on the output of the acceleration sensor 260 to that of a signal representing the angle θ2 of rotational shake correction that has been calculated based on the output of the angular velocity sensor 250. And if these DC components have turned out to be different from each other, then the digital camcorder 100 further compares the respective AC components of the signals representing those angles θ1 and θ2 to each other. By making such comparisons, the digital camcorder 100 determines whether the signal representing the angle θ1 that has been calculated based on the output of the acceleration sensor 260 has significant noise or not, and determines the angle of correction appropriately based on a result of the comparison. Thus, the degree of reliability of the angle of correction to calculate can be increased. As a result, the tilt correction can get done appropriately with a delay of response, which would otherwise be involved with excessive filtering processing to reduce the output noise, reduced significantly so that a proper response is ensured.

Embodiment 2

Next, a second embodiment will be described. In the second embodiment, the controller 180 determines the angle of rotation to make a tilt correction in a different procedure from in the first embodiment described above. In the other respects, however, the configuration of this embodiment is the same as that of the first embodiment. Thus, the following description of this second embodiment will be focused on that difference from the first embodiment.

In the first embodiment described above, the controller 180 determines whether or not the DC components of signals representing the angles θ1 and θ2 that have been calculated based on the results of detection obtained by the acceleration sensor 260 and angular velocity sensor 250 agree with each other (in Step S330), and then determines whether or not their AC components correspond to each other (in Step S350). However, the angle of rotation to make a tilt correction does not always have to be determined in this order.

Figure 7:
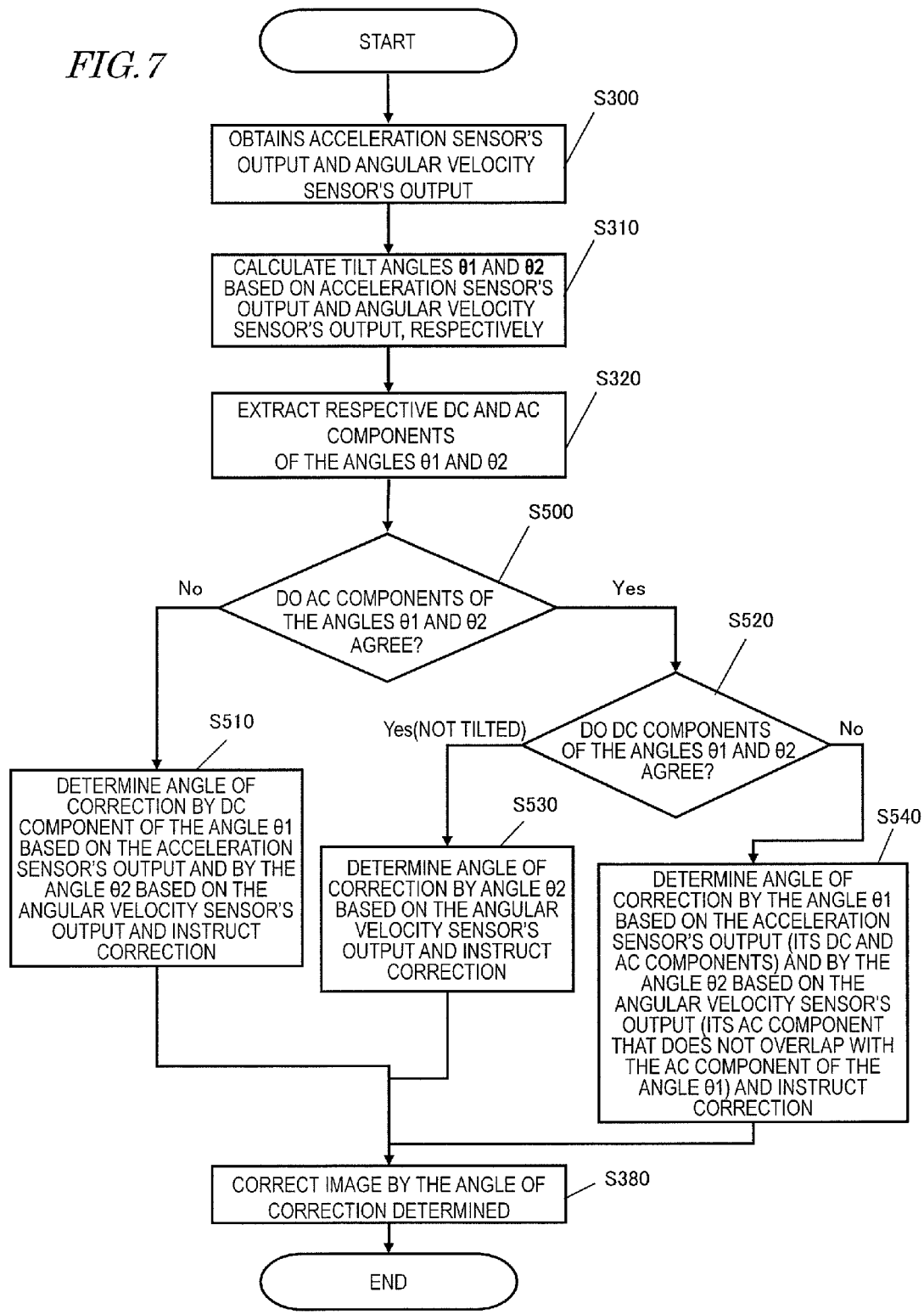
FIG. 7 is a flowchart showing the procedure of an image tilt correcting operation according to a second exemplary embodiment.

FIG. 7 is a flowchart showing the procedure in which the controller 180 of this embodiment determines the angle of correction. The processing steps S300, S310 and S320 are the same as their counterparts of the first embodiment, and their description will be omitted herein. As shown in FIG. 7, the controller 180 determines first whether or not the AC components of signals representing the angles θ1 and θ2 that have been calculated based on the results obtained by the acceleration sensor 260 and angular velocity sensor 250 correspond to each other (in Step S500). If the answer to the query of the processing step S500 is YES, then the controller 180 determines next whether or not their DC components agree with each other (in Step S520). If the answer to the query of the processing step S520 is YES, the controller 180 performs the processing step S530. On the other hand, if the answer is NO, then the controller 180 performs the processing step S540. Meanwhile, if the answer to the query of the processing step S500 shown in FIG. 7 is NO, then the controller 180 performs the processing step S510. In this case, these processing steps S510, S530, and S540 respectively correspond to the processing steps S370, S340 and S360 shown in FIG. 4.

As a result, the tilt correction can also get done appropriately according to this embodiment with quick enough response ensured by reducing a delay of response that would otherwise be involved with excessive filtering processing to reduce the output noise.

As described above, unless the AC components of the first and second signals θ1 and θ2 correspond to each other, the controller 180 of the digital camcorder 100 of this embodiment determines the angle of correction based on the second signal θ2 and the DC component of the first signal θ1 (in Step S510 shown in FIG. 7). As a result, even if the AC component of the first signal θ1 that has been obtained based on the output of the acceleration sensor 260 is not a reliable one, the angle of correction can also be determined appropriately.

On the other hand, if the first and second signals' AC components θ1 and θ2 correspond to each other and if the difference between respective values of the first and second signals' DC components θ1 and θ2 is equal to or greater than a predetermined threshold value, the controller 180 determines the angle of correction based on the first signal θ1 (in Step S540 shown in FIG. 7). As a result, as long as it is a reliable one, the output of the acceleration sensor 260 is used, and therefore, the angle of correction can be determined more appropriately.

Furthermore, if the first and second signals' AC components θ1 and θ2 correspond to each other and if the difference between respective values of the first and second signals' DC components θ1 and θ2 is equal to or greater than the predetermined threshold value, the controller 180 determines the angle of correction based on the DC and AC components of the first signal θ1 and on a portion of the AC component of the second signal θ2 that does not overlap with the AC component of the first signal θ1. As a result, even RF components which cannot be corrected sufficiently with only the angle of correction that has been determined based on the output of the acceleration sensor 260 can also be corrected sufficiently, and therefore, the rotational shake correction can be made even more accurately.

Furthermore, if the first and second signals' AC components θ1 and θ2 correspond to each other and if the difference between respective values of the first and second signals' DC components θ1 and θ2 is smaller than the threshold value, the controller 180 determines the angle of rotation based on the second signal θ2. As a result, in a situation where the digital camcorder is not tilted, the output of the angular velocity sensor 250 which should be more reliable than that of the acceleration sensor 260 is used, and therefore, the angle of correction can be determined appropriately.

Other Embodiments

Although Embodiments 1 and 2 have been described herein as just examples of the technique of the present disclosure, various modifications, replacements, additions or omissions can be readily made on those embodiments as needed and the present disclosure is intended to cover all of those variations. Also, a new embodiment can also be created by combining respective elements that have been described for those embodiments disclosed herein.

Thus, some other embodiments will be described just as examples.

In the first embodiment described above, the angle of correction is determined by performing any of the three processing steps S340, S360 and S370 shown in FIG. 4 depending on the situation. Likewise, in the second embodiment described above, the angle of correction is determined by performing any of the three processing steps S510, S530 and S540 shown in FIG. 7 depending on the situation. However, these are just examples. Rather, the controller 180 just needs to be configured to determine the angle of rotation to correct the tilt of the image based on a result of comparison between respective DC components of the first and second signals θ1 and θ2 and/or a result of comparison between first and second signals' AC components θ1 and θ2. For example, the controller 180 may be configured to perform at least one of the processing steps S340, S360 and S370 shown in FIG. 4 or at least one of the processing steps S510, S530 and S540 shown in FIG. 7.

Figure 8:
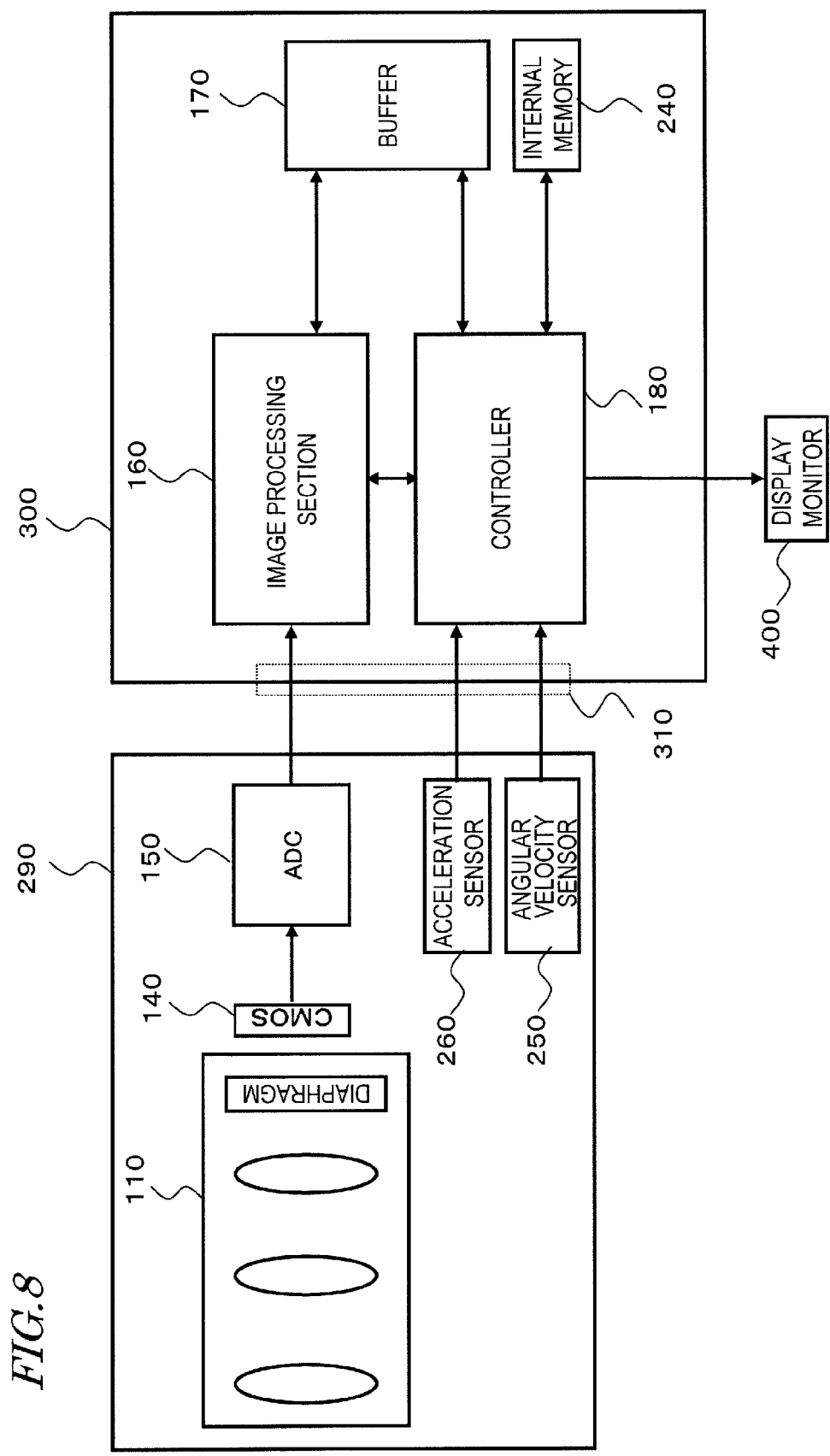
FIG. 8 is a block diagram showing a configuration for a system including an image processor 300 according to another embodiment.

In the embodiment described above, the digital camcorder (which is an example image capture device according to the present disclosure) 100 is configured to perform image tilt correction processing by itself. However, the tilt correction processing may also be carried out by another device (i.e., an image processor) instead of the image capture device itself. FIG. 8 illustrates an exemplary system including such an image processor 300. This system includes an image capture device 290, an image processor 300 and a display monitor 400. The image processor 300 obtains an image that has been generated by the image capture device 290 and corrects the tilt of that image by performing the same processing as what has already been described for the first or second embodiment.

The image capture device 290 includes an optical system 110, a CMOS sensor 140, an A/D converter 150, an angular velocity sensor 250, and an acceleration sensor 260, each of which may be the same as its counterpart of the first or second embodiment described above. The image information provided by the A/D converter 150, the acceleration information provided by the acceleration sensor 260, and the angular velocity information provided by the angular velocity sensor 250 are sent to the interface 310 of the image processor 300 either directly or over a network (not shown) or via a storage medium (not shown, either).

The image processor 300 includes an image processing section 160, a controller 180, a buffer 170, an internal memory 240, and the interface 310. Each of the image processing section 160, controller 180, buffer 170, and internal memory 240 may be the same as its counterpart of the first embodiment described above. The image processor 300 obtains the image information, acceleration information and angular velocity information that have been provided by the image capture device 290 via the interface 310. The image processing section 160 and controller 180 correct the tilt of the image and either displays it on the display monitor 400 or stores it on a storage medium (not shown) by performing the same processing as what has already been described for the first or second embodiment (shown in FIG. 4 or 7).

By adopting such a configuration, the image processor 300 can correct the tilt of the captured image. As can be seen, the function of correcting the tilt of the image that has been described for the first or second embodiment does not have to be performed by the image capture device itself. By adopting the configuration shown in FIG. 8, it is possible to provide a system in which image information, acceleration information and angular velocity information that have been generated by the digital camcorder (image capture device) are transmitted to a remote server computer (image processor) over a network and in which the server computer corrects the tilt of the image and returns the corrected image to the sender.

As can be seen, an image processor 300 according to the present disclosure processes a signal supplied from an image capture device 290 that includes an image capturing section 110 which generates an image by shooting, an acceleration sensor 260 which detects the acceleration of gravity, and an angular velocity sensor 250 which detects an angular velocity. The image processor 300 includes: an interface 310 which obtains a signal representing the image, a signal representing the output of the acceleration sensor 260, and a signal representing the output of the angular velocity sensor 250; and a controller 180 which determines the angle of rotation of the image based on a result of comparison between respective DC components of first and second signals θ1 and θ2 representing the outputs of the acceleration sensor 260 and the angular velocity sensor 250, respectively, and/or a result of comparison between first and second signals' AC components θ1 and θ2. As a result, the tilt of the image can be corrected as appropriately as in the first and second embodiments described above.

Alternatively, a configuration in which the first half of the processing through the processing step of setting the angle of the image is carried out by the image capture device 290 and in which the processing of correcting the tilt of the image based on the angle is carried out by the image processor 300 may also be adopted. In such a configuration, the controller 180 is provided for the image capture device 290, instead of the image processor 300.

In the embodiments described above, either the digital camcorder 100 or the image capture device 290 is supposed to detect a camera shake in the roll direction with the angular velocity sensor 250. That is to say, the angular velocity sensor 250 is supposed to function as the "angular velocity detector". However, this configuration is only an example. Optionally, a camera shake in the roll direction may be detected by analyzing the image, too. Specifically, the angular velocity in the roll direction may be detected by calculating a motion vector in the direction in which the subject included in the captured image rotates. In short, any configuration may be adopted as long as the influence of the camcorder's own rotational shake on the image produced on the image capturing plane of the image sensor can be detected. In those examples, either the controller 180 or the image processing section 160 functions as the "angular velocity detector".

Furthermore, even though the technique of the present disclosure is supposed to be applied in the embodiments described above to a camcorder that records a moving picture, this technique is also applicable to a digital camera that generates only still pictures.

Furthermore, the technique of the present disclosure is also applicable to a software program defining the tilt correction processing. The operation defined by such a program may be performed as shown in FIG. 4 or 7, for example. Such a program may be either distributed by being stored on a removable storage medium or downloaded over telecommunications lines. Various kinds of operations that have been described for the embodiments of the present disclosure can be performed by making a processor built in a computer execute such a program.

Various embodiments have been described as examples of the technique of the present disclosure by providing the accompanying drawings and a detailed description for that purpose.

That is why the elements illustrated on those drawings and/or mentioned in the foregoing description include not only essential elements that need to be used to overcome the problems described above but also other inessential elements that do not have to be used to overcome those problems but are just mentioned or illustrated to give an example of the technique of the present disclosure. Therefore, please do not make a superficial decision that those inessential additional elements are indispensable ones simply because they are illustrated or mentioned on the drawings or the description.

Also, the embodiments disclosed herein are just an example of the technique of the present disclosure, and therefore, can be subjected to various modifications, replacements, additions or omissions as long as those variations fall within the scope of the present disclosure as defined by the appended claims and can be called equivalents.

The technique of the present disclosure is applicable to various kinds of image capture devices including digital camcorders, digital cameras, cellphones with camera, and smart phones with camera. This technique is also applicable to personal computers, server computers, mobile telecommunications terminals, and numerous other kinds of computers as well.

While the present invention has been described with respect to exemplary embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2012-193782 filed Sep. 4, 2012, and No. 2013-052268 filed Mar. 14, 2013, the entire contents which are hereby incorporated by reference.

What is claimed is:

1. An image capture device comprising:
an image capturing section configured to capture a subject image and to generate an image;
an acceleration detector configured to detect acceleration and output a first signal;
an angular velocity detector configured to detect angular velocity and output a second signal; and
a controller configured to determine an angle of rotation of the generated image based on at least one of a result of comparison between DC components of the first and second signals and a result of comparison between AC components of the first and second signals, wherein
when the controller determines the angle of rotation of the generated image based on the result of comparison between AC components of the first and second signals, the controller determines the angle of rotation of the generated image using the DC component of the first signal and at least part of the AC components of the second signal.

2. The image capture device of claim 1, wherein when the difference between respective values of the first and second signals' DC components is smaller than a preset threshold value, the controller determines the angle of rotation based on the second signal.

3. The image capture device of claim 2, wherein when the difference between respective values of the first and second signals' DC components is equal to or greater than the threshold value and unless the first and second signals' AC components correspond to each other, the controller determines the angle of rotation based on the second signal and the first signal's DC component.

4. The image capture device of claim 2, wherein when the difference between respective values of the first and second signals' DC components is equal to or greater than the threshold value and when the first and second signals' AC components correspond to each other, the controller determines the angle of rotation based on the first signal.

5. The image capture device of claim 4, wherein when the difference between respective values of the first and second signals' DC components is equal to or greater than the threshold value and when the first and second signals' AC components correspond to each other, the controller determines the angle of rotation based on the first signal's DC and AC components and on a portion of the second signal's AC component that does not overlap with the first signal's AC component.

6. The image capture device of claim 1, wherein unless the first and second signals' AC components correspond to each other, the controller determines the angle of rotation based on the second signal and the first signal's DC component.

7. The image capture device of claim 6, wherein when the first and second signals' AC components correspond to each other and when the difference between respective values of the first and second signals' DC components is equal to or greater than a predetermined threshold value, the controller determines the angle of rotation based on the first signal.

8. The image capture device of claim 7, wherein when the first and second signals' AC components correspond to each other and when the difference between respective values of the first and second signals' DC components is equal to or greater than the predetermined threshold value, the controller determines the angle of rotation based on the first signal's DC and AC components and on a portion of the second signal's AC component that does not overlap with the first signal's AC component.

9. The image capture device of claim 6, wherein when the first and second signals' AC components correspond to each other and when the difference between respective values of the first and second signals' DC components is smaller than the threshold value, the controller determines the angle of rotation based on the second signal.

10. The image capture device of claim 1, further comprising an image processing section configured to correct the image by rotating the coordinates of the image by the angle of rotation that has been determined by the controller.

11. An image processor that processes a signal supplied from an image capture device including an image capturing section configured to capture a subject image and to generate an image, an acceleration detector configured to detect acceleration, and an angular velocity detector configured to detect angular velocity, the image processor, comprising:
an interface configured to obtain a signal representing the image, a first signal representing the output of the acceleration detector, and a second signal representing the output of the angular velocity detector; and
a controller configured to determine an angle of rotation of the obtained image based on at least one of a result of comparison between DC components of the first and second signals and a result of comparison between AC components of the first and second signals, wherein
when the controller determines the angle of rotation of the generated image based on the result of comparison between AC components of the first and second signals, the controller determines the angle of rotation of the generated image using the DC component of the first signal and at least part of the AC components of the second signal.

12. An image processing method for processing a signal supplied from an image capture device including an image capturing section configured to capture a subject image to generate an image, an acceleration detector configured to detect acceleration, and an angular velocity detector configured to detect angular velocity, the method comprising:
obtaining a signal representing the image, a first signal representing the output of the acceleration detector, and a second signal representing the output of the angular velocity detector; and
determining an angle of rotation of the image based on at least one of a result of comparison between DC components of the first and second signals and a result of comparison between AC components of the first and second signals, wherein
when the controller determines the angle of rotation of the generated image based on the result of comparison between AC components of the first and second signals, the controller determines the angle of rotation of the generated image using the DC component of the first signal and at least part of the AC components of the second signal.

* * * * *